United States Patent
Diab et al.

(10) Patent No.: US 8,271,480 B2
(45) Date of Patent: *Sep. 18, 2012

(54) SEARCH SYSTEM USING SEARCH SUBDOMAIN AND HINTS TO SUBDOMAINS IN SEARCH QUERY STATEMENTS AND SPONSORED RESULTS ON A SUBDOMAIN-BY-SUBDOMAIN BASIS

(75) Inventors: Ali Diab, Atherton, CA (US); Scott A. Gatz, San Francisco, CA (US); Shyam Kapur, Sunnyvale, CA (US); David Ku, Fremont, CA (US); Chuck Kung, Los Altos, CA (US); Phu Hoang, San Francisco, CA (US); Qi Lu, San Jose, CA (US); Lynne Pogue, Menlo Park, CA (US); Yuan Kui Shen, Cupertino, CA (US); Norman Shi, Fremont, CA (US); Thai Tran, Redwood City, CA (US); Eckart Walther, Palo Alto, CA (US); Jeff Weiner, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 623 days.

This patent is subject to a terminal disclaimer.

(21) Appl. No.: 12/354,751

(22) Filed: Jan. 15, 2009

(65) Prior Publication Data

US 2009/0157642 A1    Jun. 18, 2009

Related U.S. Application Data

(63) Continuation of application No. 10/819,082, filed on Apr. 5, 2004, now Pat. No. 7,499,914.

(60) Provisional application No. 60/460,658, filed on Apr. 4, 2003.

(51) Int. Cl.
G06F 17/30    (2006.01)
(52) U.S. Cl. ......... 707/720; 707/729; 707/731; 707/782
(58) Field of Classification Search ................... 707/720
See application file for complete search history.

(56) References Cited

U.S. PATENT DOCUMENTS 4,884,218 A * 11/1989 Agnew et al. ................... 706/50
5,913,214 A    6/1999 Madnick et al.
(Continued)

FOREIGN PATENT DOCUMENTS

JP    9265482    10/1997
(Continued)

OTHER PUBLICATIONS

Japanese Office Action received in application No. 2006-509740, Applicant: Yahoo! Inc., dated Mar. 22, 2011 (3 pages).
(Continued)

*Primary Examiner* — Binh V Ho
(74) *Attorney, Agent, or Firm* — Hickman Palermo Truong Becker Bingham Wong LLP

(57) ABSTRACT

A method and apparatus for generating search results including searching by subdomain and providing sponsored results by subdomain is provided. A search system according to embodiments of the present invention analyzes search queries to determine if they are to be routed to subdomains and presents results include sponsored hits sponsored on a subdomain by subdomain basis.

19 Claims, 7 Drawing Sheets

U.S. PATENT DOCUMENTS

| | | | |
|---|---|---|---|
| 6,006,224 | A | 12/1999 | McComb |
| 6,085,186 | A * | 7/2000 | Christianson et al. ............... 1/1 |
| 6,243,071 | B1 | 6/2001 | Shwarts et al. |
| 6,269,361 | B1 | 7/2001 | Davis et al. |
| 6,298,343 | B1 * | 10/2001 | Chang et al. ......................... 1/1 |
| 6,415,285 | B1 | 7/2002 | Kitajima et al. |
| 6,418,434 | B1 | 7/2002 | Johnson et al. |
| 6,490,579 | B1 | 12/2002 | Gao |
| 6,553,364 | B1 | 4/2003 | Wu |
| 6,671,681 | B1 | 12/2003 | Emens et al. |
| 6,718,324 | B2 | 4/2004 | Edlund et al. |
| 6,721,780 | B1 | 4/2004 | Kasriel et al. |
| 6,721,847 | B2 | 4/2004 | Hursey |
| 6,732,088 | B1 | 5/2004 | Glance |
| 6,735,586 | B2 | 5/2004 | Timmons |
| 6,772,150 | B1 | 8/2004 | Whitman et al. |
| 6,804,677 | B2 | 10/2004 | Shadmon et al. |
| 6,842,782 | B1 * | 1/2005 | Malik et al. .................. 709/224 |
| 6,947,930 | B2 | 9/2005 | Anick et al. |
| 7,035,864 | B1 | 4/2006 | Ferrari et al. |
| 7,136,875 | B2 * | 11/2006 | Anderson et al. ..................... 1/1 |
| 7,168,034 | B2 | 1/2007 | Hennings et al. |
| 7,209,915 | B1 | 4/2007 | Taboada et al. |
| 7,213,198 | B1 | 5/2007 | Harik |
| 7,228,494 | B2 | 6/2007 | Kapoor et al. |
| 7,376,650 | B1 * | 5/2008 | Ruhlen ............................... 1/1 |
| 2002/0040389 | A1 | 4/2002 | Gerba et al. |
| 2002/0052925 | A1 * | 5/2002 | Kim et al. .................... 709/217 |
| 2002/0059369 | A1 * | 5/2002 | Kern et al. .................... 709/203 |
| 2002/0073088 | A1 | 6/2002 | Beckmann et al. |
| 2002/0095256 | A1 | 7/2002 | Jones et al. |
| 2002/0116577 | A1 | 8/2002 | Hursey |
| 2003/0065639 | A1 * | 4/2003 | Fiennes et al. .................... 707/1 |
| 2003/0236782 | A1 | 12/2003 | Wong et al. |
| 2004/0024745 | A1 * | 2/2004 | Jeng et al. ......................... 707/2 |
| 2004/0024748 | A1 * | 2/2004 | Brown et al. ..................... 707/3 |
| 2004/0064351 | A1 | 4/2004 | Mikurak |
| 2004/0064447 | A1 | 4/2004 | Simske et al. |
| 2004/0083205 | A1 | 4/2004 | Yeager |
| 2004/0093327 | A1 * | 5/2004 | Anderson et al. ................ 707/3 |
| 2004/0162757 | A1 | 8/2004 | Pisaris-Henderson et al. |
| 2004/0199498 | A1 | 10/2004 | Kapur et al. |
| 2005/0033641 | A1 | 2/2005 | Jha et al. |
| 2005/0071325 | A1 * | 3/2005 | Bem ................................ 707/3 |
| 2005/0144064 | A1 | 6/2005 | Calabria et al. |
| 2005/0192946 | A1 | 9/2005 | Lu et al. |
| 2007/0061602 | A1 | 3/2007 | Matsuda |
| 2007/0124471 | A1 | 5/2007 | Harada et al. |
| 2008/0319976 | A1 | 12/2008 | Morris et al. |

FOREIGN PATENT DOCUMENTS

| | | |
|---|---|---|
| JP | 9305619 | 11/1997 |
| JP | 2000-172711 A | 6/2000 |
| WO | WO 98/12881 | 3/1998 |
| WO | WO 98/12881 A2 | 3/1998 |
| WO | WO 01/53970 A2 | 7/2001 |
| WO | WO 01/57725 A2 | 8/2001 |

OTHER PUBLICATIONS

Current claims of Japanese application No. 2006-509740, Applicant: Yahoo! Inc., dated Mar. 2011 (4 pages).

Notice of Preliminary Rejection in Korean Patent Application No. 10-2005-7018923, dated Jun. 29, 2011, Applicant: Yahoo! Inc., 3 pages.

Current Claims, Korean Paten Application No. 10-2005-7018923, dated Jun. 2011, Applicant: Yahoo Inc., 6 pages.

European Patent Office, "Office Action" in Application No. 04 758 906.4-1225, Applicant: Yahoo! Inc., Dated Jun. 16, 2011, 5 pages.

Current Claims in Application No. 04 758 906.4-1225, Applicant: Yahoo Inc., Dated Jun. 2011, 4 pages.

South Korean Office Action received in 10-2005-7018923 dated Oct. 25, 2010 (4 pages).

Current claims of 10-2005-7018923 (6 pages).

Japanese Office Action received in 2006-509740 dated Jan. 4, 2010 (7 pages).

Current claims of 2006-509740 (2 pages).

Supplemental European Search Report received in European Application No. 04758906.4 dated Jan. 7, 2010 (3 pages).

Glover, E. et al., "Architecture of a MetaSearch Engine That Supports User Information Needs" Proceedings of the 8th Int'l Conf. on Information Knowledge Mgmt. New York Nov. 2, 1999, XP000895328 (pp. 210-216).

Manber, U. et al., "The Search Broker" The University of Arizona Dec. 1, 1997, XP002560216 retrieved from the Internet: < URL:http://reference.kfupm.edu.sa/content/s/e/the_search_broker_56366 > retrieved on Dec. 14, 2009 (10 pages).

Japanese Patent Office, Translation of Examiner's Opinion in Japanese Application No. 2006-509740, Applicant: Yahoo! Inc., dated Feb. 6, 2012, 2 pages.

Current Claims in Japanese Application No. 2006-509740, Applicant: Yahoo! Inc., dated Sep. 14, 2011, 3 pages.

Current Claims in Korean Application No. 10-2005-7018923, Applicant: Yahoo! Inc., dated Sep. 14, 2011, 8 pages.

Japanese Office Action received in 2006-509740 dated Jun. 7, 2010 (8 pages).

Current claims of 2006-509740 (3 pages).

Nakamura, T. "How to improve your skill in internet retrieving! how to master internet retrieving," PC Japan, Japan softbank publishing, Apr. 1, 2003, vol. 8, No. 4 (9 pages, including partial English translation).

"Notification of Transmittal of the International Search Report and the Written Opinion of the International Searching Authority, or the Declaration" received in International application No. PCT/US2008/076561 received Feb. 16, 2009 (4 pages).

Office Action from JP for foreign patent application No. 2006-509740 dated Mar. 27, 2012 with English translation (2 pgs).

Current Claims in JP for foreign patent application No. 2006-509740 (4 pgs).

\* cited by examiner

YAHOO!  Help link     Home page link

Search Results  | camera | [Search]  Advanced Search / About These Results

Your search: camera       Search in: The Web | Directory | News

302 — Inside Yahoo!      300
- Auctions: over 800 Camera products on Yahoo! Auctions
- Yellow Pages: find a Camera Store near you Directory Category Matches 304 —
- Photography > Cameras
- Shopping > Cameras
- List "camera" results by location

Sponsor Matches

306 —
- Camera Specials
- Camera - Compare Prices at -------.com
- Digital & 35mm Cameras

Web Matches

308 —
1. La Camera
2. Digital Camera Resource Page
3. Camera, The
4. CAMERA Studies — pharetra enim, portitor lacinia magna fells ac lectus. Integer

310

—————ADVERTISEMENT—————

Search in: The Web | Directory | News

312 — Related Searches: digital camera, camera review, hidden camera, video camera 314 — There are more results for camera in....
Yahoo! Shopping, Yahoo! Yellow Pages, Yahoo! Auctions and Yahooligans!

FIG. 3

SEARCH SYSTEM USING SEARCH SUBDOMAIN AND HINTS TO SUBDOMAINS IN SEARCH QUERY STATEMENTS AND SPONSORED RESULTS ON A SUBDOMAIN-BY-SUBDOMAIN BASIS

CROSS-REFERENCES TO RELATED APPLICATION

This application is a continuation of U.S. patent application Ser. No. 10/819,082 filed Apr. 5, 2004 now U.S. Pat. No. 7,499,914 which is incorporated herein by reference as if fully set forth herein, under 35 U.S.C. §120; which claims the benefit of priority under 35 USC §119 from U.S. Provisional Patent Application Ser. No. 60/460,658, entitled "Search System Using Search Subdomain and Hints to Subdomains in Search Query Statements and Sponsored Results on a Sub-domain-By-Subdomain Basis", filed on Apr. 4, 2003, the disclosure of which is hereby incorporated by reference in its entirety for all purposes.

FIELD OF THE INVENTION

The present invention relates to content retrieval in general and more particularly to methods and apparatus for retrieving content in response to a search request.

BACKGROUND

In a content retrieval system, a user makes a request for content and receives content matching that request. The user can be a human user interacting with a user interface of a computer that processes the requests and/or forwards the requests to other computer systems. The user could also be another computer process or system that generates the request programmatically. In the latter instance, it is likely that the requesting computer user will also programmatically process the results of the request, but it might instead be the case that a computer user makes a request and a human user is the ultimate recipient of the response, or even the opposite, where a human user makes a request and a computer user is the ultimate recipient of the response.

Content retrieval systems are in common use. One common system in use today is referred to as the Internet, a global internetwork of networks, wherein nodes of the network send requests to other nodes that might respond with content. One protocol usable for content requesting is the HyperText Transport Protocol (HTTP), wherein an HTTP client, such as a browser) makes a request for content referenced by a Uniform Resource Locator (URL) and an HTTP server responds to the requests by sending content specified by the URL. Of course, while this is a very common example, content retrieval is not so limited.

For example, networks other than the Internet might be used, such as token ring, WAP, overlay, point-to-point, proprietary networks, etc. Protocols other than HTTP might be used to request and transport content, such as SMTP, FTP, etc. and content might be specified by other than URL's. Portions of present invention are described with reference to the Internet, a global internetwork of networks in common usage today for a variety of applications, but it should be understood that references to the Internet can be substituted with references to variations of the basic concept of the Internet (e.g., intranets, virtual private networks, enclosed TCP/IP networks, etc.) as well as other forms of networks. It should also be understood that the present invention might operate entirely within one computer or one collection of computers, thus obviating the need for a network.

The content itself could be in many forms. For example, some content might be text, images, video, audio, animation, program code, data structures, formatted text, etc. For example, a user might request content that is a page having a news story (text) and an accompanying image, with links to other content (such as by formatting the content according to the HyperText Markup Language (HTML) is use at the time).

HTML is a common format used for pages or other content that is supplied from an HTTP server. HTML-formatted content might include links to other HTML content and a collection of content that references other content might be thought of as a document web, hence the name "World Wide Web" or "WWW" given to one example of a collection of HTML-formatted content. As that is a wellknown construct, it is used in many examples herein, but it should be understood that unless otherwise specified, the concepts described by these examples are not limited to the WWW, HTML, HTTP, the Internet, etc.

In some instances, content is accessed in response to a request for a uniquely identified content object. For example, a user seeking to obtain the content of Yahoo!'s home page for the Yahoo! Sports property can initiate a web browser client and enter in the URL sports.yahoo.com in a dialog box provided by the web browser client for such purpose. In response to that request, the web browser client is programmed to make a request for the specified page to a particular server, which responds with the requested page, all as is well known to those familiar with request/response protocols such as HTTP and HTTPS.

In other instances, the user might not have a specific URL in mind and instead issues a more general request for content in the form of a search query. In a typical search query, the user is presented with a dialog box wherein the user enters search query terms and initiates a request based on those terms. One example of a search is a Yahoo! search. One way to perform a Yahoo! search is by directing a web browser client to the page with the URL www.yahoo.com and entering a search query in the search dialog box provided on that page. In response to such a query, which the web browser client sends to a www.yahoo.com server (or other server as directed by references contained in the page's HTML or other code), the receiving server in turn performs a search or causes a search to be performed and returns search results to the web browser client, usually in the form of a page or pages.

In one variation of a search and response currently in use, the user enters a string of one or more characters, typically in the form of one or more words or concepts (tokens) separated by delimiters, such as spaces or commas, and the search results are a page that contains several search hits organized by where they where found. For example, a search results page might list matching "Inside Yahoo!" hits, matching Yahoo! directory hits, matching sponsored hits, matching Web search hits, etc. It should be understood that "matching" can have different meanings in different search contexts. For example, in some search contexts, matching is exact and in other search contexts, matching is approximate, such as where singular forms and corresponding plural forms are considered matches.

Some searches are performed over all available documents, but other searches might be performed over one or more subdomain of documents available to be searched. For example, while all public Yahoo! properties might be available for a search, a search limited to the Yahoo! Travel property or the Yahoo! Sports property might be preferred. Often a user generating a query will know which subdomain to search and can so limit his or her search. However, this typically requires extra steps, such as navigating to a page associated with the particular subdomain and entering the search terms there.

One solution for subdomain searching is to provide a browser or other software with a search dialog box that processes searches based on search words that map to XML files indicating how to perform a search with the various pages associated with subdomains. For example, search strings beginning with "dic" would be processed by an XML file dic.xml that contains instructions on how the client should simulate the user entering in the remaining arguments into the search dialog box that would be provided on the page that is associated with the "dic" command. While this might work well for pages that do not change in structure, the pages used are typically not under the control of the client and the XML files are stored local to the client. Because of this, when the maintainer of, for example, the dictionary web site to which the dic.xml file is directed changes the structure of the page, the search might fail to operate properly, requiring each client to rewrite or update their XML instructions for accessing that changed page and simulating user entry of a search.

What is needed is an improved search using subdomains and other techniques.

SUMMARY

A search system according to embodiments of the present invention analyzes search queries to determine if they are to be routed to subdomains and presents results include sponsored hits sponsored on a subdomain by subdomain basis.

Other features and advantages of the invention will be apparent in view of the following detailed description and preferred embodiments.

BRIEF DESCRIPTION OF THE DRAWINGS

FIG. 3 is an illustration of a search results page.

Figure 1:
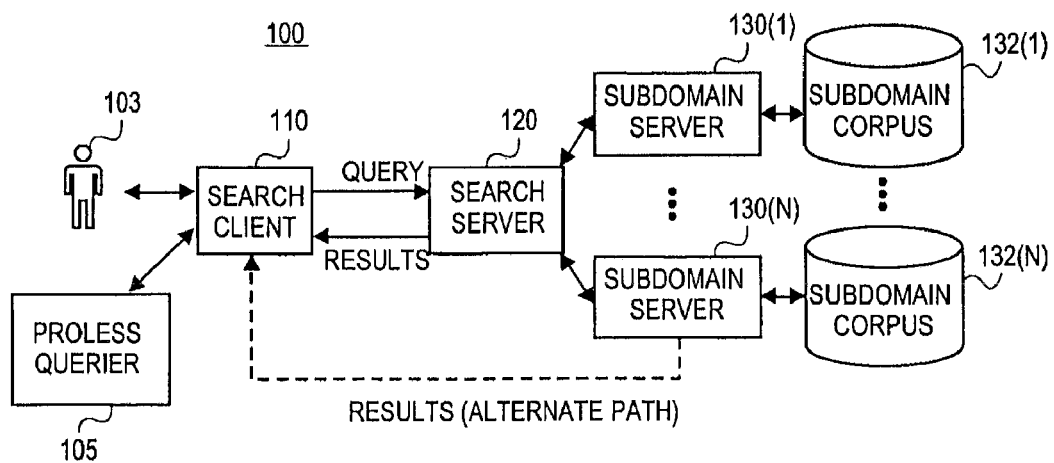
FIG. 1 is a block diagram of a search system according to embodiments of the present invention.

Appendix A is a list of hints, namely an example of subdomain keywords that might be used as hint keywords used to limit searches to particular subdomains.

DETAILED DESCRIPTION

Embodiments of the invention will now be described, by way of example, not limitation. It is to be understood that the invention is of broad utility and maybe used in many different contexts.

The example of a search process as described herein below can be modeled by a searcher presenting to a search system a query and receiving a response (search results) indicating the one or more "hits" found. A query can be in the form of a search query string comprising one or more tokens delimited by delimiters or parsing rules. In addition to varying a search based on variations of the search query string, context might be also taken into account. For example, the querier might have previously set constraints on the search, such as to return only age-appropriate hits, prior searches might be taken into account, and a querier identity (such as the Yahoo! ID currently associated with the Web browser client submitting the search query string) and settings set by the user.

When a query is received by a search system, it processes the search and returns one or more "hits", where a "hit" is the atomic unit handled by the search system. For example, where the search system manages a structured database, the hits are records from the structured database. Where the search system manages documents, such as text documents, image and text documents, image documents, HTML documents, PDF documents, or the like, the atomic unit is the document. It should be understood that the present invention is not limited to any particular atomic unit, but by way of example, much of this disclosure describes searching using the document as the atomic unit. Furthermore, a structured database is not required.

A hit is an atomic unit that the search system identifies as matching criteria defined by the query. It should be understood that the search system need not provide all hits or only hits that match the query. For example, the search system might limit the number of hits returned to some number, might apply other limitations to the query term, such as omitting hits that match the query, ignore duplicate hits, etc. The search system might also expand the search results to include hits that almost match the query, hits that are designated to be included in searches, such as special topic hits, advertising hits, etc. Some expansion or contraction might be dependent on the size or content of the search results prior to such expansion or contraction. For example, the search engine might add hits that are close if no hits would otherwise be returned and might remove hits if too many hits would have been returned, such as by deleting common words from queries prior to completing the search results.

A searcher can be a human user, such as a person typing in search terms into a browser window to query a search engine via the Web, but can also be an automated process, such as a computer program capable of sending queries to search engines in the form expected by the search engine. For example, a computer program might generate queries and form HTTP messages directed at a Web server coupled to a search engine.

In many of the examples shown herein, the search engine searches among a set of documents for documents (hits) that match the criteria defined by the query. It should be understood that the term "document" is generally used to refer to units of the corpus being searched. A document can be a document, such as a contract, a file, a story, a writing, or the like, but might also be a snippet of text, data that might be considered part of a document in other contexts, program code, image data, a stored file, or the like. Therefore, the term need not be narrowly construed.

In searching, the search engine might pull from all available documents it has indexed, but the search engine might instead limit the search to just documents within one or more subdomains, where a subdomain is a previously designated proper subset of all the documents available to the search engine. In some instances, a subdomain might be further subdivided into smaller subdomains.

Examples of subdomains are the Yahoo! properties. Examples of Yahoo! properties include Yahoo! News, Yahoo! Sports, Yahoo! Mail, Yahoo! Shopping, Yahoo! Auctions, Yahoo! Weather, etc. Subdomains are useful search tools as a user posing a query often knows that information outside of a particular domain would not be useful in that instance. For example, the user might be interested in obtaining weather information for New York. A global search might pick up many sports stories that incidentally mention the weather in New York and its effect on some sports events, but the user might already have determined that any hits outside of the Yahoo! Weather property would not be useful. As another example, the user might want to search his or her stored Yahoo! e-mail using keywords that would result in only a few hits within the stored e-mails but thousands of hits if searched over all Yahoo! properties or Web pages. One advantage of the use of subdomains is that the user can enter a search in a generic search input object, such as a dialog box, and have the search server analyze the search query string to determine the user's intended subdomain(s). Another advantage of the use of subdomains is that sponsored links or targeted advertising that, for example, might support a search service provided to users at no charge to them, is that sponsored links and advertisements can be allocated to sponsors and advertisers on a subdomain-by-subdomain basis.

Referring now to the figures, an exemplary search system will now be described.

FIG. 1 is a block diagram of a search system 100 according to embodiments of the present invention. Using search system 100, a querier issues a search request to a search server using a search client, such as a Web browser client. As shown in FIG. 1, a human user 103 or a computer process 105 issues a query using search client 110. The search query, typically in the form of a search query string, is sent to a search server 120, which returns search results responsive to the search query to search client 110. In other variations, the search query comes from one system and the results are routed to another system.

Search server 120 is shown coupled to several subdomain servers 130 that are in turn coupled to corresponding subdomain corpuses 132. It should be understood that, for storage efficiency or other reasons, the content or information of the subdomain corpuses might overlap such that some content or information is present in more than one subdomain corpus. Throughout this disclosure, where there are multiple instances of an object and the number of instances is not critical, the instances are numbered from "1" to "N" with the understanding that the value of N need not be identical from use to use, unless otherwise indicated. For example, N is used as the number of subdomains, but that number might vary from example to example. It should also be understood that nothing here requires that all instances be used.

The interconnections between various systems need not be described in detail, as such methods of interconnections can be accomplished using well-known techniques. For example search client 110 might be a personal computer running an HTTP client, such as a Web browser client, and communicating with an HTTP server running at search server 120, interconnected over a network such as the global Internet. It should be understood that other embodiments also fall within the scope of the invention. For example, search client 110 might be implemented as a handheld device, a computer with no human user interface, a dedicated device, a kiosk, etc. Also, the clients and servers need not use HTTP, but might use a different protocol for making requests for pages and objects and for responding to those requests.

In operation, and as described in further detail below, search client 110 sends a search query string to search server 120, possibly also including context data such as a Yahoo! ID of the Yahoo! user sending the request. With that context, search server 120 might look up user demographics for the identified user and use that to inform the search. Search server 120 parses and analyzes the search query string to determine if a subdomain search is appropriate, then sends the query to the appropriate subdomain(s) or performs a general search. As illustrated, the search results can be returned by search server 120, but they might instead be returned directly by a subdomain server.

Figure 2:
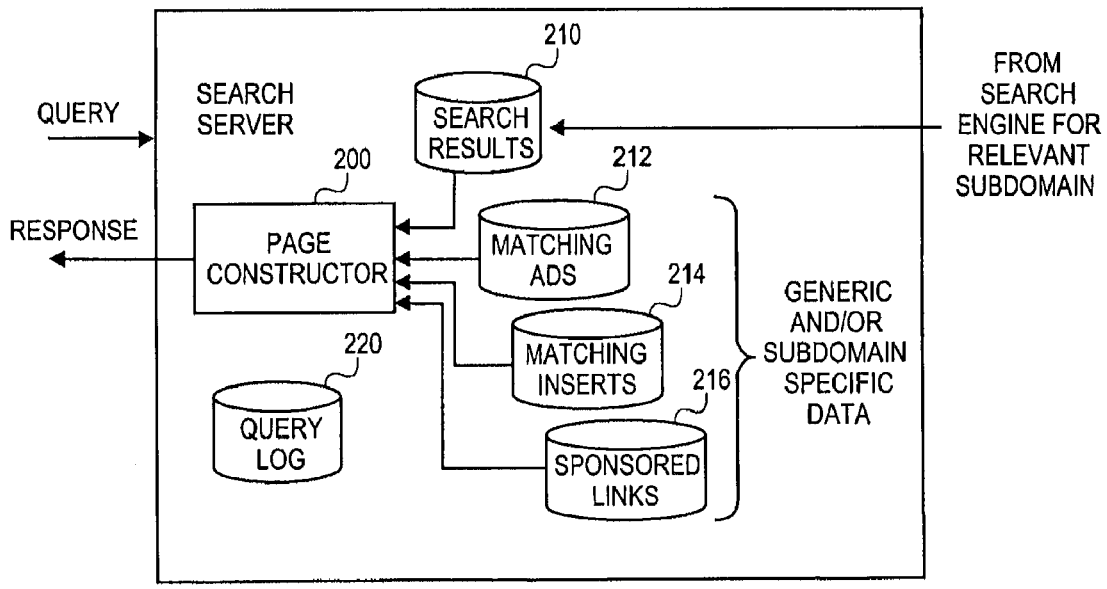
FIG. 2 is a block diagram showing elements of the search server of FIG. 1 in more detail.

FIG. 2 illustrates elements of a search server in greater detail. As shown there, the search server includes a page constructor 200, and storage for search results 210, matching ads 212, matching inserts 214, sponsored links 216 and a query log 220. From a received query, the search server obtains search results 210, either by performing a search itself or by requesting results from another search engine. Typically, a search is performed using an index to the corpus being searched, such as a keyword index. In that case, the search results 210 are the hits that are generated based on the index. Page constructor 200 then generates a page from elements in storage 210-216 and sends the page as a response to the search query.

An example of a page 300 constructed by page constructor 200 is shown in FIG. 3. In this example, the search string was "camera". Page 300 includes information organized into different page layout areas 302, 304, 306, 308, 310, 312 and 314.

The top of page 300 includes an indication of the search, a dialog box in which another search can be initiated, and clickable links for help, home page, etc. Simple search results, such as search results from a Web index for "camera", are listed in layout area 308. In this example, upon a search query using the query string "camera", the search server populates storage 210 with Web search results, and possibly other results, populates storage 212 with advertisements to be associated with the search string, populates storage 214 with inserts associated with the search string and populates storage 216 with sponsored links associated with the search string.

Advertisements might be selected based on what views are sold. Thus, an advertiser might pay to have a particular advertisement shown on a search results page if the search query includes the word "camera". Sponsored links might also be similarly positioned, such that the order and/or placement of the links might depend on who pays for their presentation and for what search conditions.

Layout area 308 includes links that represent hits responsive to the search term and are preferably independent of who sponsors links. Layout area 310 is provided for insertion of the matching advertisement, or a general advertisement in some cases. Layout area 312 and 314 provide additional matching inserts, which are specific to the search terms used, but are typically not search results, sponsored matches or advertisements. In this example, layout area 312 contains links for executing alternative searches and layout area 314 contains links for subdomain specific searches that might be alternatively executed.

In the preferred embodiment, however, subdomain searches can be run directly in the first instance from the search query dialog box. For example, where the user knows that he or she is searching for an auction on a camera, the user can indicate that directly, rather than typing in "camera" and selecting the link "Yahoo! Auctions" in layout area 314. This saves the user time and effort and also allows for more targeted inserts, advertisements and sponsored links. For example, the user might specify a search string "auctions camera" and the search server might interpret the first token, "auctions" as being a subdomain hint instead of being part of the search string proper. In that case, the search server would direct the search string "camera" to a subdomain server specific to Yahoo! Auctions.

The search results page would be more focused as a result. The matching inserts might not include a link for yellow page searches for the search term and the sponsored links and advertisements can be selective. Thus, one sponsor might opt to purchase sponsored link placements for the term "camera" under the auction subdomain, but not under a general search or a search in the yellow pages subdomain. In this manner, advertisements and sponsored links can be more focused. This is useful, for example, if an advertiser wants to reach users that are looking to buy or sell cameras at auction, but not if that user is looking for the location of a local camera store.

Layout area 302 displays matching inserts 214. In this example, those matching inserts are "Inside Yahoo!" links that relate to the search term. Layout area 304 displays directory matches, which are matches from a subdomain encompassing the Yahoo! directory, a hierarchical arrangement of topics and links associated with those topics at various levels in the hierarchy. Layout area 306 displays sponsored matches, which are hits provided to the user based on sponsorship of particular terms.

In some browser or other input device configurations, the user is provided with a toolbar for entering searches, setting preferences, selecting/editing personalize hint sets (e.g., a list that might be a subset of the list shown in Appendix A), and jumping directly to some services without a search, such as a main mailbox page. As another example, a search query for "map Sunnyvale 94089" might not require a search, but simply a transfer to the map property, site or system, with an unambiguous request for a map of Sunnyvale, Calif.

Figure 4:
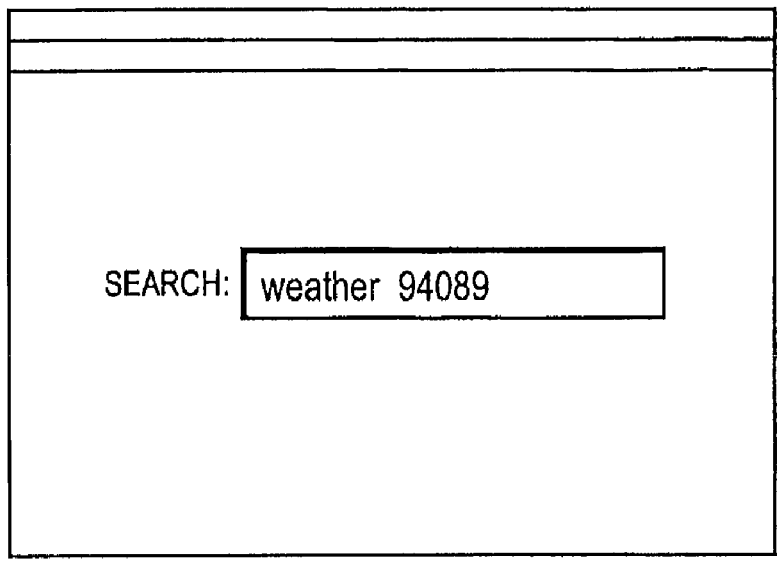
FIG. 4 is an illustration of a page that might be presented to a user for acceptance of a search sequence that is parseable into a subdomain search.

While the user might enter a simple search query such as "camera", the user might also enter more complex queries, including searches that might be applied to subdomains. For example, the search entered in the dialog box shown in FIG. 4, "weather 94089" might be applied to a subdomain. If a general search were performed, over all Web pages for example, the search would present more hits than are useful and most likely many irrelevant hits. However, if the entered sequence is treated as a parseable subdomain search, a search server might process the query by identifying "weather" as being a hint to the subdomain of a weather search system and pass the request to a weather search engine.

In some implementations, the hints are not merely words that are associated with subdomains. For example, a search server might maintain a set of business rules that help determine when a hint is present. For example, a rule might interpret a search string as having a subdomain hint when it begins or ends with a five digit number and the subdomain hint limits a search based on a zip code. Thus, a search for "weather 94089" might include two hints, "weather" indicating that the search should be done over the weather subdomain, such as the Yahoo! Weather site, and the search should be limited to areas corresponding to the zip code "94089".

Many variations of hints are possible. For example, "94089 pizza" might be interpreted as a search over a yellow pages subdomain because it begins with a five-digit hint and that it is a search for a pizza provider in the indicated zip code. In some implementations, a search server might also maintain personalizations for users. With a personalization, the hints used might be specific to the user. Thus, one user might have set up a personalization so that the hint string "res" is interpreted as a resume search whereas another user might have set up the hint string "res" to be interpreted as a restaurant search.

With these personalizations stored at the search server, rather than at the client, user's can perform searches that are personalized at different locations.

Figure 5:
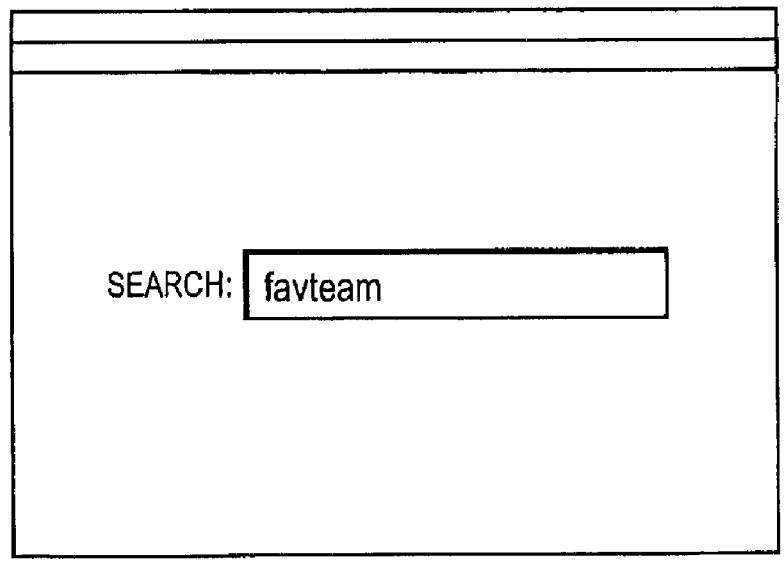
FIG. 5 is an illustration of a page that might be presented to a user for acceptance of a search sequence that is parseable into a subdomain search that is a bookmark search.

In some cases, the personalization could be to such a degree that a hint "searches" over a subdomain having only one hit, so that the search dialog box can be used, in effect, as a bookmark retrieval. Thus, as illustrated in FIG. 5, a user might personalize his or her hints such that a search query string of "favteam" results in one returned hit that is the home page of the user's favorite sports team. While this is not strictly a search, as the returned page will typically be a specific URL specified in advance, the same interface could be used as searching, leading to a more integrated perception of the dialog box to the user. At the server end, some steps in the page generation process might be the same for bookmark, or "navigational", searches. For example, the matching of inserts, advertisements and the like might proceed as with a subdomain search that searches an index of a plurality of hits.

Figure 6:
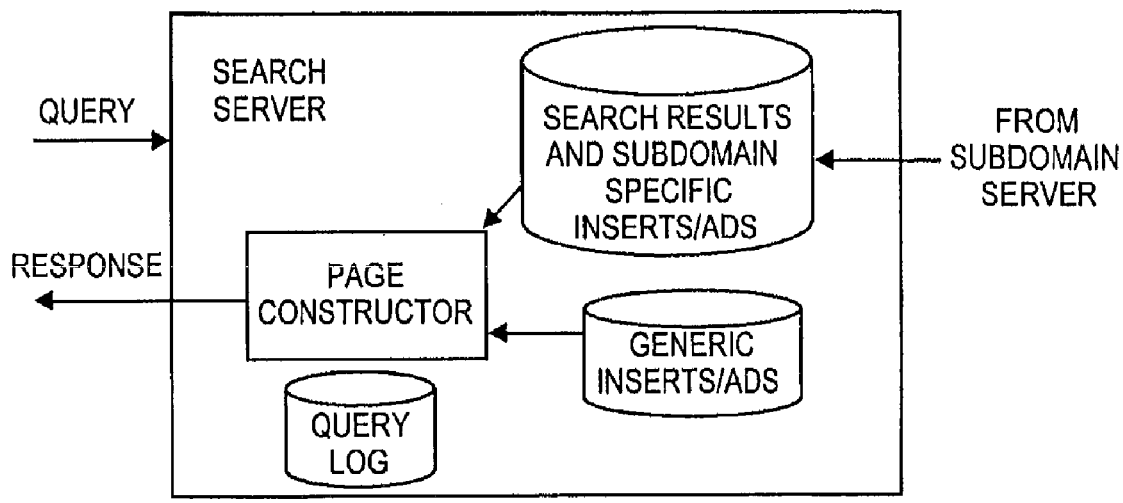
FIG. 6 is a block diagram of another variation of the search server.

FIG. 6 is a block diagram showing several elements that might be used with a search server. As shown there, storage is provided for search results and subdomain specific inserts/advertisements, as well as for generic inserts/advertisements. With a search server that personalizes searches, a search for "places where weather is not too hot" might result in a results page of hits, inserts and advertisements where the inserts and advertisements are determined and/or specified by the subdomain server the actually performs the search. Generic inserts and advertisements that are not specific to the search or not specific to the subdomain might also be provided. Where a search is a navigational search, generic inserts and advertisements might be used unless further context could be determined by the label the user used as the bookmark for the navigational search or the URL associated with the bookmark label.

Figure 7:
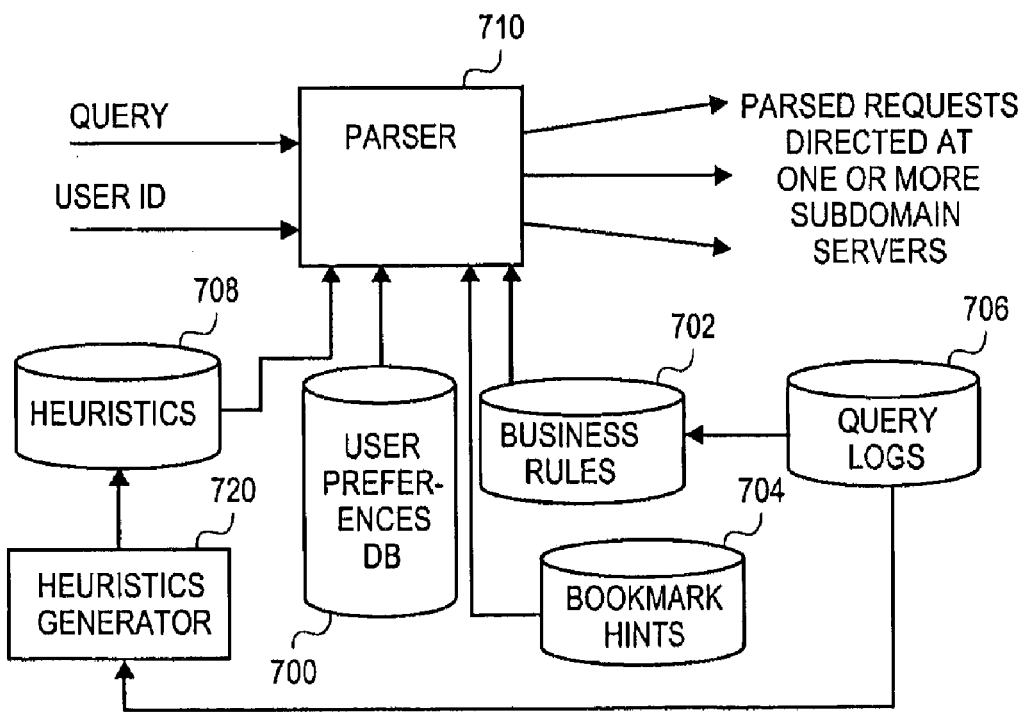
FIG. 7 illustrates other elements of a search server.

FIG. 7 is a block diagram showing storage as might be used in a parsing process, including storage 700 for user preferences, storage 702 for business rules and storage 704 for bookmark hints. Storage 700 might include all or a subset of the user's indicated settings and/or preferences. For example, where the user's settings are the user's Yahoo! Preferences, that might include the user's age, location, gender, interests, etc. Business rules might include mappings from words to subdomains, such as "weather", "news", "directory lookup" and the like. The business rules can be the same set for all users, or some users can have customized rules. Each user can have customized bookmarks, but there might also be a generic set of bookmarks.

When a parser 710 receives a search query string and an indication of the user making the query, parser 710 can use the contents of storage 700, 702, 704 to determine which tokens in the string are hints and make the appropriate search request to the appropriate subdomain server. The page constructor that receives search results back can use storage 700, 702, 704 to determine the inserts and/or advertisements to include for the search results page. Since the page constructor can use that information (it is readily accessible to the search server), inserts and advertisements can be subdomain specific. For example, the operator of the search server can sell advertisements for specific keywords on a subdomain-bysubdomain basis. Thus, one pizza parlor can buy all the advertising for one set of zip codes when they occur with the search term "pizza", while another pizza parlor in a very different location can also buy all of the advertising for "pizza", but for a different set of zip codes. This allows advertising, especially of location-dependent offerings, to be more focused.

Business rules 702 might be determined based on contents of query log(s) 706. The operation of parser 710 might be influenced by heuristics 708, that might in turn come from a heuristics generator 720 that determines from query logs 706 various rules that can be applied to queries based on past behavior.

Figure 8:
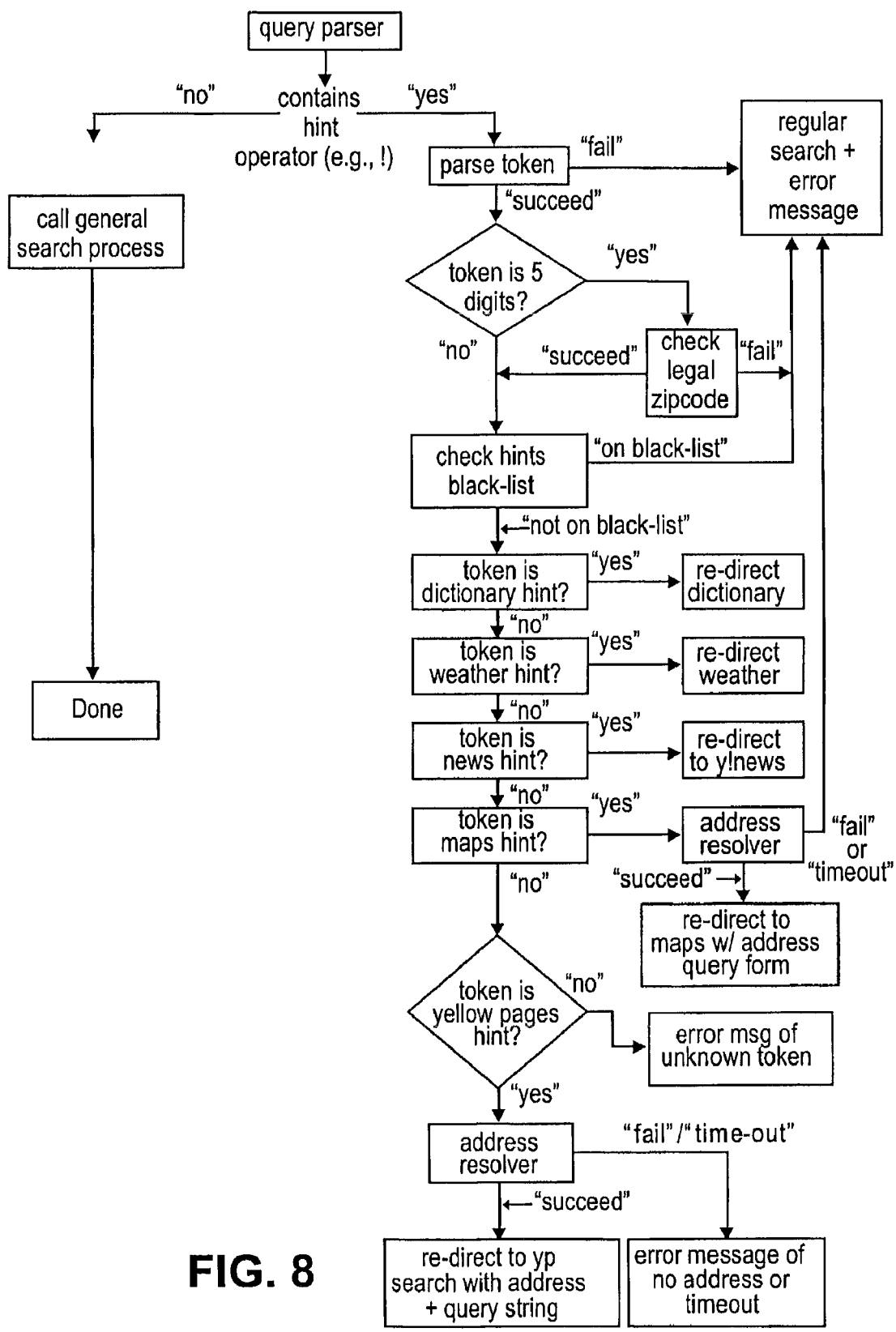
FIG. 8 is a flowchart of a process for parsing and analyzing a search query and invoking subdomain searches as needed.

FIG. 8 is a flowchart of one example of a process a search server might perform to parse and effect a search in response to a search query string received from a user. In this example, searches that are to be processed as having at least one hint, for subdomain searching or otherwise, are preceded by a hint operator, such as "!". In some implementations, hint operators are not needed, but in others they reduce ambiguity and allow for regular searching to be performed using what would otherwise be deemed a hint. As shown, in this case if the hint operator is not present, a general search process is called, such as a general Web search, using the search query string as input. In some cases, an initial step is parsing the search query string to determine which part of it comprises the hint. In other cases, the hint is deemed to be implicit and the searcher server determines when an implicit hint is to be added.

If the hint operator is present, or is implied, the search query string is parsed. Varying business rules could apply, but here one example is provided. If the first token is five digits, it is initially interpreted as a zip code and checked against a list of valid zip codes. If no token is recognized, a regular search could be performed, possibly with a message to the user that no hint was recognized although the hint operator was used.

If a hint is recognized, it is then compared against a blacklist of terms that are not to be considered hints. For example, the search string '194089 Adventures" might be interpreted as the hint operator, a zip code hint of 94089 and a remainder search string of "adventures". If "94089 Adventures" were the name of a popular movie, this search query would be constantly misinterpreted. To avoid this, the string "94089 Adventures" is placed on the blacklist, causing that string to be interpreted as a string without hints.

Assuming that the hint operator is present, a hint is detected and the hint is not present on the blacklist, the hint token is considered by the search server. If the hint is for a dictionary subdomain search, the remainder search string is passed to a dictionary subdomain search server. This might be done by redirecting the user's client to the appropriate server. Likewise, if the hint is for weather, news, maps, etc., subdomain search, the request is directed to the appropriate subdomain.

In the case of map, yellow pages, etc. subdomain searches, additional hints might be used to do address resolution. For example, the search query string "!yp 94089 parks" might be interpreted as the hint operator, the "yp" (yellow pages) hint, an additional hint of "94089" that is used to limit the search and a remainder string of "parks". Thus, the above search query string would cause a search of a yellow pages subdomain for parks, limited to those with a zip code of 94089. In cases where the zip code (or postal code or other indicator) is not valid, or an address cannot be resolved, the response can be a general search and an error message. In some instances, such as a yellow pages search where no location can be discerned, the response might be just an error message.

In some browser or other input device configurations, the user is provided with a toolbar for entering searches, setting preferences, selecting/editing personalize hint sets (e.g., a list that might be a subset of the list shown in Appendix A), and jumping directly to some services without a search, such as a main mailbox page for a search query string deemed to be a request for a mailbox page. As another example, a search query for "map Sunnyvale 94089" might not require a search, but simply a transfer to the map property, site or system, with an unambiguous request for a map of Sunnyvale, Calif.

An example of subdomain keywords that might be used as hint keywords is shown in Appendix A. These subdomain keywords can be used to limit searches to particular subdomains and might also be used to influence searches within those subdomains. In some cases, depending on the subdomain, the search system might recast the search query as an instruction other than a search. For example, the search system might interpret "mail from mom" as a search over the mail subdomain, for the identified user's mail database, searching for mail from "sender=mom", while the search system might interpret "! mail" or simply "mail" as a request to open the user's mail interface at some default condition, such as a page for the user's in mailbox.

In some variations, users can personalize how the search system interprets hints for that user. One way to do this is to provide a set of customized shortcuts for each user, group of like-minded users, or sets of customized shortcuts that users can select from. For example a set of "music enthusiast" customized shortcuts and a set of "oil driller" customized shortcuts might be created, such that when a drummer in a band selects the "music enthusiast" shortcuts for use (or as a base from which to further personalize), a search for "drum store" leads to search results for places to buy snare drums and the like, while a trucker for the oil industry might select the "oil driller" customized shortcuts, such that the search "drum store", leads to vendors of oil drums.

In yet other search system variations, the search system might provide suggestions for additional searches or information based on user history and/or profile. For example, the drummer might be provided with unprompted information, such as trivia about drums, additional useful searches that other drummers found useful, etc.

In yet another variation, the search might include an implicit limitation to certain portions of the corpus searched. Thus, a search user or a search system operator might include preferential treatment for vertical applications that are under control of the user or operator. This might be part of a plan to find commonly owned sites first or to limit the interference of third parties who would modify their content to attempt to show up in more searches.

As part of the implicit hint operations, the search system might include logic to detect implicitly local searches. For example, most searches for auto dealerships are implicitly local, as a car buyer does not typically go outside a local area to purchase a vehicle. Thus, when a searcher enters "Ford dealership" the search system could add an implicit search hint of the user's zip code (or approximate zip code or location). Location can be determined in a number of ways, such as by looking to the user preferences, if the user is identified and has expressed preferences, IP/network address, mobile access point (to find information local to where the mobile device user is presently, rather than their address from preferences).

For such localized searches, the user might be given a selection of whether to disable the "locality" of the search to get a generic search, pick another location, etc. In one variation, the user is returned both local search results and generic search results, with display elements (color, offset, labels, etc.) to distinguish them from each other.

Where searches can be done over areas having different languages or dialects, the location information might be used to automatically spell check or translate or otherwise adjust the search query. For example, if the search query "boot organizer" is entered and the search is detected as coming from North America, it might be disambiguated to "shoe storage organizers", whereas is the search is detected as coming from the United Kingdom or other English speaking area of similar dialect, the search might be disambiguated to "automotive compartment storage units".

Depending on the offerings of the search system operator, some of the search queries might be parsed to account for the path taken by the user to entering a search or business rules that drive advertisements or content placement. For example, if the user visits a sports page then jumps to a search entry page and enters a search, the results might be influenced by knowledge that the user is currently involved in looking at sports-related pages. Thus, a search for "competition" could provide pages related to competition in sports, while a user coming from financial pages would be provided, for that same search string, pages related to business competition.

For business rule driven results, the search system operator might offer advertisers the selectivity to only show their advertisements to users that perform certain searches following certain paths taken, so that one searcher for "competition" sees an advertisement for sports training camps to improve competitiveness on the field whereas another searcher for "competition" sees an advertisement for market and industry analysis services. As another example, a person searching for "Washington" from a news path would get political advertisements, whereas a person searching for "Washington" from a travel path might get a prompt or link to a weather page. Additional business rules might be available for disambiguation.

Notably, the explicit hints are not limited to particular positions within a search query string. For example, the search system might determine a "weather" hint in any of the strings "!weather 94089", "weather 94089", "Sunnyvale, Calif. weather", "what is the weather in area code 94089", etc. Of course, the search system might also determine location hints in the search strings. The determination of which token or tokens of a search query string are hints can often be determined by lookup tables of words with known meanings, but query logs can also be used to determine which tokens are hints. For example, a query log might be maintained where an entry in the query log includes the search query string used and the identity or indicator (title, URL, etc.) of a page from the search results that the user selected following the query. For example, if a query log indicated that users who submitted the search "Labrador" and obtained search results nearly always selected results pages having to do with dogs more so than pages to do with Canada, the search system might not use Labrador as a location hint. Thus, when a user enters a search for "Labrador food", dog food sites might appear. On the other hand, if it turned out that the query log recorded that most searchers for "Labrador" then clicked a link relating to the Canadian province, then the search system would use "Labrador" in "Labrador food" as a location hint, possibly resulting in search results for grocery stores and restaurants with a location limitation to the Canadian province of Newfoundland and Labrador.

In a variation of the use of query logs, hints might be gleaned through the noting of time variances in searches. If searches for a particular entity spike up quickly, an implicit hint of "news" might be added. Thus, when a user submits a search for "Paris fashion", the search system can return pages relating generally to fashion in Paris, but if there were an up tick in searches in the query log for "Paris Fashion", the search system might focus the search on a news subdomain, which might be what the user intended if many searchers are looking for information on some breaking story involving the Paris fashion scene.

With large numbers of searches being processed, a single search server might not be able to handle the load. To deal with that situation, the search server might comprise a plurality of servers among which incoming queries are directed. The servers might be selected based on the content of the search, but might also be selected independent of the content to even out the load.

Figure 9:
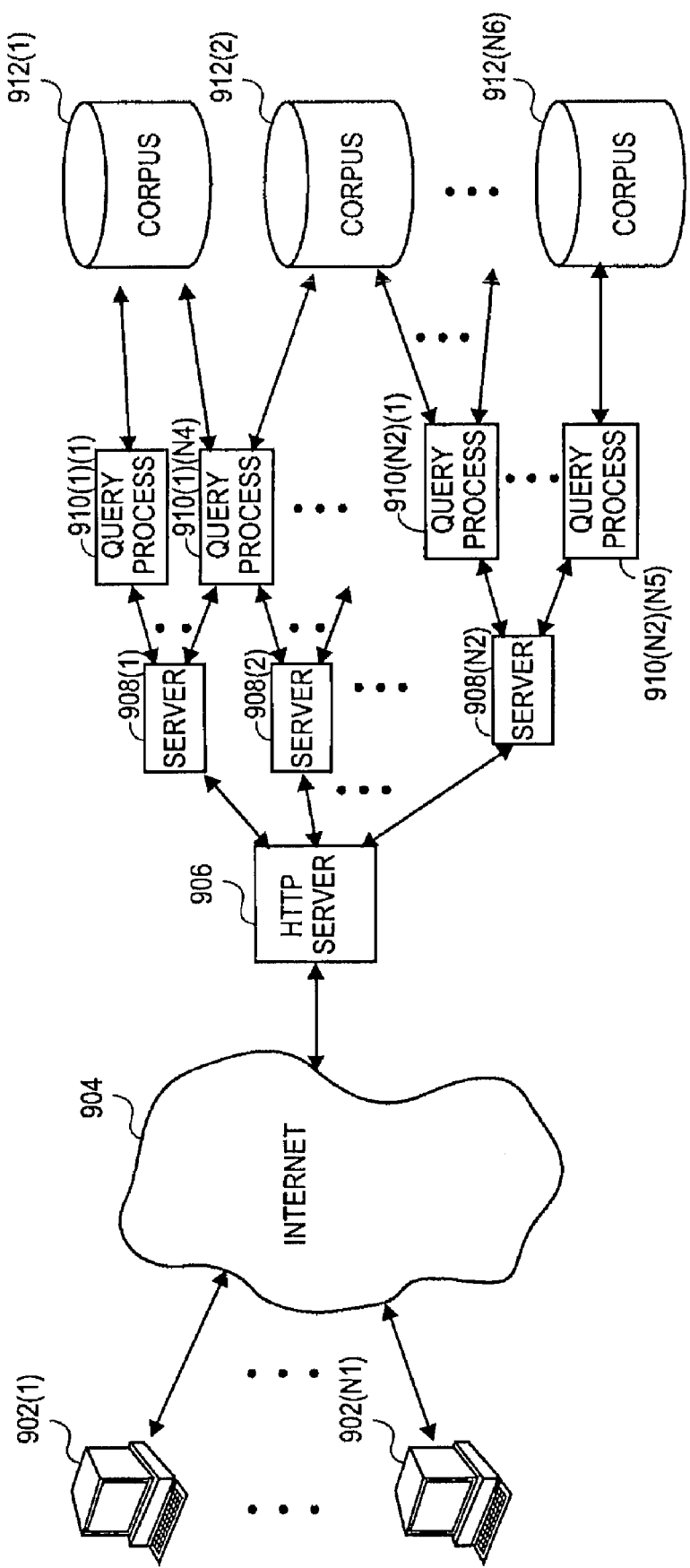
FIG. 9 is a block diagram of a distributed query handling system as might be used to process queries received and analyzed as described herein.

FIG. 9 shows a networked system in which a plurality of search clients can access a search system to apply queries to a corpus of documents. In this system, one or more (but possibly thousands or more) client systems 902 make requests via the Internet 904. The requests flow to servers 908 via an HTTP server 906, but it should be understood that multiple HTTP servers might be present and other protocols might be used instead of, or in addition to, HTTP. A server 908 sends the query to a query process 910, which might be an instantiation of a software object in server 908 or elsewhere, or might include hardware components. The query processes 910 then parse the search query strings and obtain documents, references to documents, links, or other indications of hits, from one or more corpuses 912.

In some embodiments, corpuses 912 are complete copies of the entire corpus, but in other embodiments, the corpuses 912 are subsets of the complete corpus. In the latter case, server 908 or server process 910 can determine, from the query and possibly other information, which corpus to use. Note that in some cases, one query process 910 might access more than one corpus 912, even for a single query. As an example, separate subdomains might be stored as separate corpuses.

In FIG. 9, multiple instances of objects are differentiated by a parenthetical index, such as 902(1) for a specific instance of a client system 902. For various objects, the terminal index is some unspecified number, such as "602(N1)". Where the number of objects is not required to be the same, the terminal indices are indicated with distinct variables. Thus, while exactly three servers 980 and three corpuses 912 are shown in FIG. 9, there are N2 (an indeterminate number) servers and N6 (another indeterminate number) corpuses 912 implied by FIG. 9, so a one-to-one correspondence of servers to corpuses is not required. Unless otherwise specified, different terminal indices can have the same or different values ranging from one to numbers larger than one.

In the examples above, the hints are interpreted by the parser 710. It should be noted that some preprocessing can be done at the client. Either way, the interpretation can be customized so that the resulting search is different for different users. Thus, user preferences might change the search and each user can have their own set of custom navigational hints. For example, one user's preferences might indicate their city of residence and that would be used to inform the search. For example, if the user's preference indicates "Sunnyvale, Calif." as the city of residence, the search query string "!yp pizza" might cause a search to be performed on the yellow pages subdomain for "pizza" in or near Sunnyvale, Calif. In addition to using 5-digit zip codes, 6-digit postal codes, or the like, the business rules might include lists of cities that translate into locations. Other preferences might include filtering, such as filtering out inappropriate links or limiting searches to the user's preferred language(s).

For location-specific searches, more focused results can be expected where the subdomain being searched is indexing according to location. In a search that includes a city name as a hint can be transformed into a search wherein the subdomain is filtered. For example, where a search includes "Sunnyvale" and it is for a location-indexed subdomain such as the weather subdomain, the search will be for pages that are associated with that location and have match the remainder search query string.

When a search is identified as being location-specific, the inserts and advertisements provided can be locations-specific as well. In an example above, searches for "pizza" in a location-specific search might result in a results page with an advertisement from a pizza vendor that chose to advertise only to searchers using the term "pizza" within that location. In some instances, subject-wide and locationspecific advertising campaigns might be supported where, for example, an advertiser might choose to purchase advertising on search results pages associated with a location regardless of the subdomain or search terms used. In effect, the total collection of search results pages can be subdivided for advertising or inserts campaigns based on just search results (as in the conventional "keyword" selling), just location or both.

Figure 10:
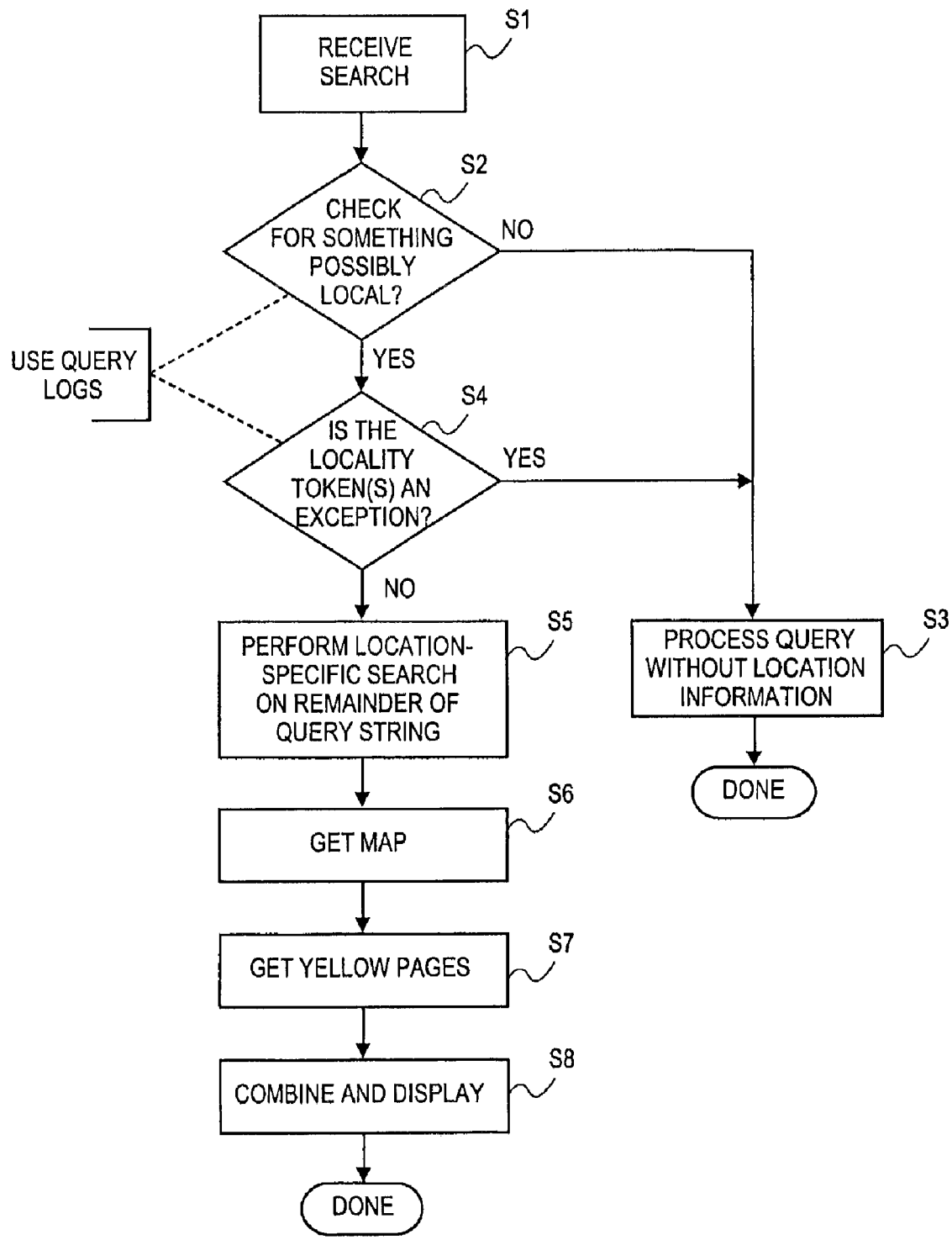
FIG. 10 is a flowchart of one possible processing flow for searches where location might be implied.

FIG. 10 is a flowchart of one possible processing flow for searches where location might be implied. As illustrated there, the search system receives a search (S1), then checks to something in the search query that might be a location (S2). If there is nothing that appears to be location-indicating, the search is processed without location specificity (S3). Next, at step S4, the location indication is checked to determine if it is an exception. For example, suppose the search query string is "Taste of France restaurant menu". "France" is identified as a location, but suppose further that the search system maintains a list of restaurants and one of those is called "Taste of France". In that case, the search is not a search with location-specificity of "France". The search system would then process the search without location specificity (step S3), although if locations are known for restaurants, location-specificity might be taken from there. The processing of steps S2 and S4 (as well as possibly other steps), might use contents of query log(s) to determine which tokens, if any, are location hints, provide implicit hints, or to determine the locations themselves.

If location-specificity is deemed present, then a local search is performed (S5), a search is done, such as by searching with a location filter of the remainder of the search query string with the location hint removed. Thus the search "restaurants in Burgundy, France" would be a search on "restaurants" (or "restaurants in") with a location filter to Burgundy, France. The filter might operate to limit the search to a corpus collected by location or to filter from a common corpus those hits that have other locations associated with them.

Next, a map might be obtained (S6) for the identified location and suitable yellow pages entries (S7) or prompts for yellow pages entries. Then, the results, map(s), yellow pages, etc. might be combined (S8) into a presentation page returned to the user.

Some hints might have synonyms, such as "dic", "dictionary" and "define" all mapping to a search of a dictionary subdomain. Some hints might be allowed in varying order, such as "!weather Sunnyvale" and "!Sunnyvale weather".

Some hints might be directory-specific, such as terms that match Yahoo!'s directory structure. For directory-specific searches, the search might be limited to selected categories of the directory. For example, the search query string "!directory lawyers Sunnyvale" would be parsed into a search with a hint indicating that it is a directory search, location-specific to Sunnyvale and a search for lawyers, rather than searching for pages of lawyers that happen to have the term "lawyer" on the page. This is likely to be more useful, as many lawyer's pages might have their name on the page but not have the term "lawyer" on the page unless that is part of the firm name.

Some hints might be in the form of customized disambiguation hints, wherein user preferences are used to disambiguate a term used in a search. For example, one user might have a customized disambiguation that indicates that "football" refers to "soccer" while another user might have a customized disambiguation that indicates that "football" refers to "American football".

These customized disambiguation hints might be generated on the fly. For example, when a user sends a search query containing a term that is flagged as being ambiguous and not already disambiguated, the user might be prompted to select a preferred meaning for the term. In another approach, disambiguation is not limited to those terms that are flagged as being ambiguous, but might be an option whenever the user decides from the search results that one or more terms used are apparently ambiguous.

For disambiguation, this might be done such that a keyword fully disambiguates the search down to a single returned page. For example, a user might send a search to a search server with the search query string "football games" and get a search results page with hundreds of pages. On the search results page, if the user can indicate a preferred page, that page can be the page brought up in response to future queries using that term. That response would be specific to that user, but the search server operator might choose to implement global disambiguations that become available to all users or some collection of users.

In yet another variation, a middle approach to disambiguation disambiguates somewhat from the general response covering all different meanings and the specific response of a specific page associated with the query term(s), and the user's disambiguation might just reduce the number of interpretations of the terms.

In many of the examples above, the corpus being searched is a generally accessible corpus. In other variations, the corpus might be some database that the user can search but that the search server normally does not operate on. An example is a corporate employee lookup, which might be only internally available to the user, but not directly accessible by the search server. In this variation, the search server might still provide a facility for searching the private data without having access to it. For example, the user can go to the dialog box used for most searches and type in "!phone Joe Jones". The search server's parser would interpret that as a request to search a "phone" subdomain and redirect the client with a modified search query string to a database that the client can access but that the search server cannot. However, the search server might still be able to provide inserts and/or advertisements for a consistent look-and-feel.

In a more generalized approach to corpuses not directly available to the search server, the search server might parse a search and broker it to another server that can field the search. Brokering searches might involve an agreement between the search server operator and an operator of a brokered search accepting system such that something of value changes hands in exchange for the brokering services.

The invention has now been described with reference to the preferred embodiments. Alternatives and substitutions will now be apparent to persons of skill in the art. Accordingly, it is not intended to limit the invention except as provided by the appended claims.

APPENDIX A

This appendix provides an example of a list of keywords that, when used in a search query string followed by a "!" (or other method of hint indication, or implicit hinting), will cause a subdomain specific search to be done. address book advice alerts ask yahoo astrology auctions autos banking bill pay bookmarks briefcase buzz index calendar careers chat city guides classifieds companion dictionary domains education encyclopedia enterprise solutions express fantasy auto racing fantasy baseball fantasy basketball fantasy football fantasy golf fantasy hockey fantasy sports finance full coverage games games on demand geocities get local greetings groups health hot jobs insurance job jobs loans lottery mail maps members message boards messenger mobile money manager movies music mutual fund my yahoo notepad pay direct people search personals pets photos picks picture gallery platinum points pool portal solutions real estate reference resumix shopping small business sports stock quotes store taxes thesaurus tickets travel tv wallet weather weather map web hosting white pages yahoo argentina yahoo asia yahoo australia yahoo baseball yahoo basketball yahoo brasil yahoo canada yahoo china yahoo denmark yahoo directory yahoo en espanol yahoo essentials yahoo family accounts yahoo football yahoo fiance yahoo germany yahoo golf yahoo help yahoo hockey yahoo hong kong yahoo horse racing yahoo india yahoo italy yahoo japan yahoo korea yahoo mlb yahoo nascar yahoo nba yahoo ncaa yahoo nfl yahoo nhl yahoo norge yahoo personals yahoo platinum yahoo sbc yahoo Singapore yahoo soaps yahoo soccer yahoo sweden yahoo taiwan yahoo tennis yahoo tv yahoo uk yahoo visa yahoo wallet yahooligans yellow pages

What is claimed is:

1. A computer-executed method comprising:
receiving, from a requesting entity, a search query comprising one or more query words, wherein the one or more query words include a particular keyword;
determining whether the particular keyword is a first hint keyword based, at least in part, on detecting, based on a query log, a pattern of usage that identifies the particular keyword as the first hint keyword;
wherein the query log comprises a record of a previous search query and an indicator of a particular document in which the requesting entity expressed an interest; and
wherein the particular document is from a set of results based on the previous search query;
in response to determining that the particular keyword is a first hint keyword, selecting a first set of one or more databases from a plurality of database sets that includes a second set of one or more databases that differs from the first set of one or more databases;
searching the first set of one or more databases for at least one query word of the one or more query words;
retrieving information regarding a first set of one or more documents resulting from the step of searching the first set of one or more databases; and
returning, to the requesting entity, the information regarding the first set of one or more documents.

2. The computer-executed method of claim 1,
wherein the step of searching the first set of one or more databases for the at least one query word further comprises excluding the first hint keyword from the at least one query word.

3. The computer-executed method of claim 1, further comprising
receiving, from a second requesting entity, a second search query comprising one or more second query words, wherein the one or more second query words include a second keyword;
determining whether the second keyword is a second hint keyword;
in response to determining that the second keyword is not a second hint keyword, searching the second set of one or more databases for at least one query word of the one or more second query words;
retrieving information regarding a second set of one or more documents resulting from the step of searching the second set of one or more databases; and
returning, to the second requesting entity, the information regarding the second set of one or more documents.

4. The computer-executed method of claim 1, further comprising:
determining a second hint keyword, wherein the second hint keyword is related to both the first hint keyword and one or more of the following:
(a) a topic of a document in which the requesting entity previously expressed interest;
(b) a location of the requesting entity;
(c) a preference specified by the requesting entity;
(d) a meaning of the first hint keyword provided by the requesting entity; or
(e) a specified meaning of the first hint keyword;
selecting the second set of one or more databases based on the second hint keyword;
searching the second set of one or more databases for the at least one query word of the one or more query words;
retrieving information regarding a second set of one or more documents resulting from the step of searching the second set of one or more databases;
returning, to the requesting entity, the information regarding the second set of one or more documents.

5. The computer-executed method of claim 1,
wherein the first set of one or more documents resulting from the step of searching includes a sponsored document; and
wherein the sponsored document is mapped to the first hint keyword.

6. The computer-executed method of claim 1, wherein the first set of one or more databases includes documents relating to maps, telephone directory lookups, weather, news, shopping, auctions, images and hierarchical directory searches.

7. The computer-executed method of claim 1 further comprising adding an additional term to the search query, based, at least in part, on the first hint keyword, that causes the search query to be directed to a particular domain.

8. The computer-executed method of claim 1, wherein determining whether the particular keyword is a first hint keyword comprises analyzing a table of possible hint keywords maintained by a search server.

9. The computer-executed method of claim 1, further comprising inferring an implicit hint based on prior query activity.

10. A computer-executed method comprising:
receiving, at a particular search server from a requesting entity, a search query comprising one or more query words, wherein the one or more query words include a particular keyword;
determining whether the particular keyword is a first hint keyword;
in response to determining that the particular keyword is the first hint keyword, selecting a first set of one or more databases, based on the first hint keyword, from a plurality of database sets that includes a second set of one or more databases that differs from the first set of one or more databases;
passing at least one query word of the one or more query words to a subdomain search server;
wherein the subdomain search server has access to the first set of one or more databases selected based on the first hint keyword; and
wherein the particular search server does not have access to the first set of one or more databases selected based on the first hint keyword;

searching, at the subdomain search server, the first set of one or more databases for the at least one query word;

retrieving information regarding a first set of one or more documents resulting from the step of searching the first set of one or more databases; and returning, to the requesting entity, the information regarding the first set of one or more documents.

11. A computer-executed method comprising:

receiving, from a requesting entity, a search query comprising one or more query words, wherein the one or more query words include a particular keyword;

determining whether the particular keyword is a first hint keyword;

in response to determining that the particular keyword is the first hint keyword, selecting a first set of one or more databases from a plurality of database sets that includes a second set of one or more databases that differs from the first set of one or more databases;

searching the first set of one or more databases for at least one query word of the one or more query words;

retrieving information regarding a first set of one or more documents resulting from the step of searching the first set of one or more databases;

searching the second set of one or more databases for at least one query word of the one or more query words, wherein the second set of one or more databases is not selected based on the first hint keyword;

retrieving information regarding a second set of one or more documents resulting from the step of searching the second set of one or more databases;

returning, to the requesting entity, the information regarding the first set of one or more documents and the information regarding the second set of one or more documents; and distinguishing information regarding the first set of one or more documents from the second set of one or more documents using a display element.

12. The computer-executed method of claim 11, wherein the step of determining whether the particular keyword is a first hint keyword further comprises comparing the particular keyword against a list of words that are not hint keywords.

13. The computer-executed method of claim 11, wherein the step of determining whether the particular keyword is a first hint keyword further comprises comparing a type of the particular keyword against a list of types of keywords that are not hint keyword types.

14. The computer-executed method of claim 11, wherein the step of determining whether the particular keyword is a first hint keyword further comprises detecting a pattern in the particular keyword, wherein the pattern is identified by a business rule to be indicative of a hint keyword.

15. The computer-executed method of claim 11, wherein the step of determining whether the particular keyword is a first hint keyword further comprises:

determining whether the particular keyword is delimited by one or more hint operators; and in response to determining that the particular keyword is delimited by the one or more hint operators, then determining that the particular keyword is the first hint keyword.

16. The computer-executed method of claim 11, wherein only one document results from the step of searching; and wherein the one document is mapped to the first hint keyword.

17. The computer-executed method of claim 11, further comprising:

parsing the particular keyword from the search query based on one or more of the following:

(a) one or more hint operators delimiting the particular keyword;

(b) a mapping of the particular keyword to one or more databases;

(c) detecting a particular pattern in the search query identified by a business rule to be indicative of the particular keyword; or (d) a preference established by the requesting entity, wherein the preference identifies the particular keyword.

18. The computer-executed method of claim 17, wherein the step of parsing the particular keyword from the search query is based on the preference established by the requesting entity; and wherein the preference comprises one or more of the following:

(a) a keyword provided by the requesting entity;

(b) a particular word of a plurality of words selected by the requesting entity to be a keyword, wherein the plurality of words is provided to the requesting entity; or (c) information about the requesting entity provided by the requesting entity.

19. The computer-executed method of claim 17, further comprising returning an error message to the requesting entity;

wherein the step of parsing the particular keyword from the search query is based on one or more hint operators delimiting the particular keyword; and wherein the particular keyword is not the first hint keyword.

* * * * *